Feb. 11, 1969  G. E. SCHEITLIN ET AL  3,427,094
REARVIEW MIRROR AND ADJUSTING MECHANISM THEREFOR
Filed Oct. 17, 1966  Sheet 1 of 3
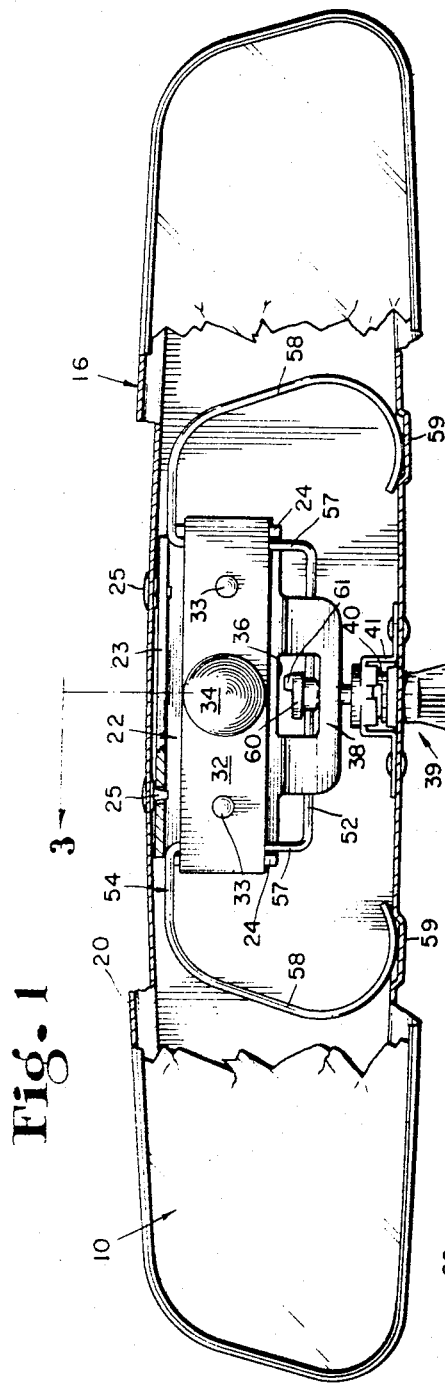
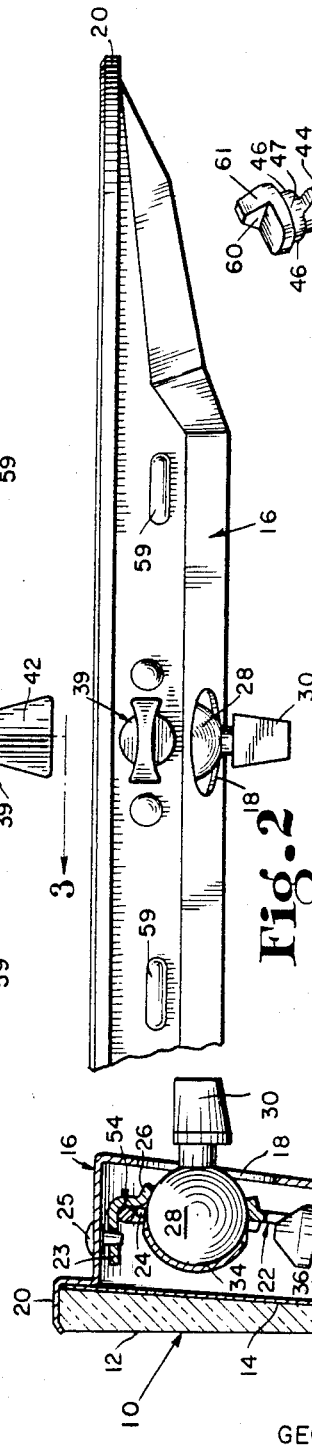
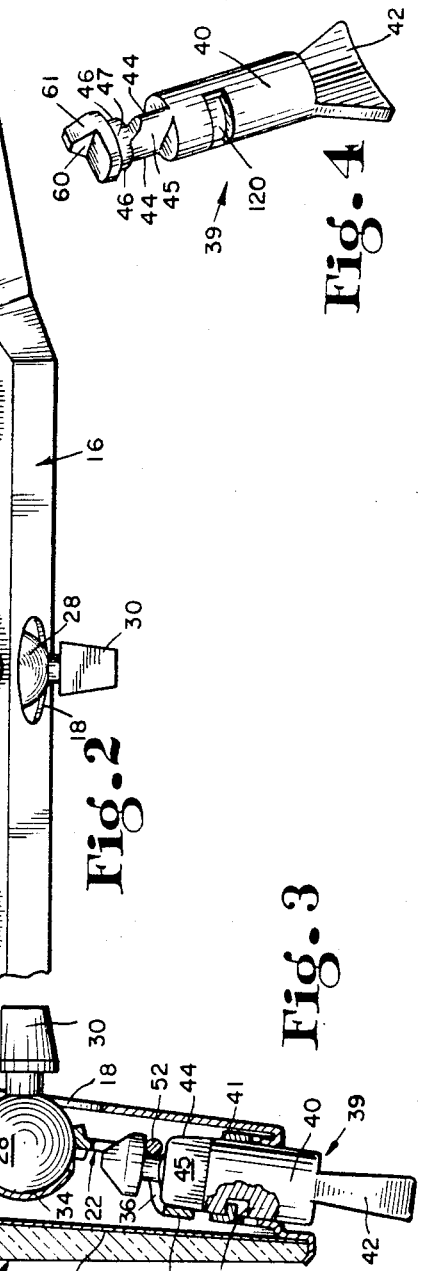
INVENTORS
GEORGE E. SCHEITLIN
JOHN C. BRIGHTON
BY
ATTORNEYS

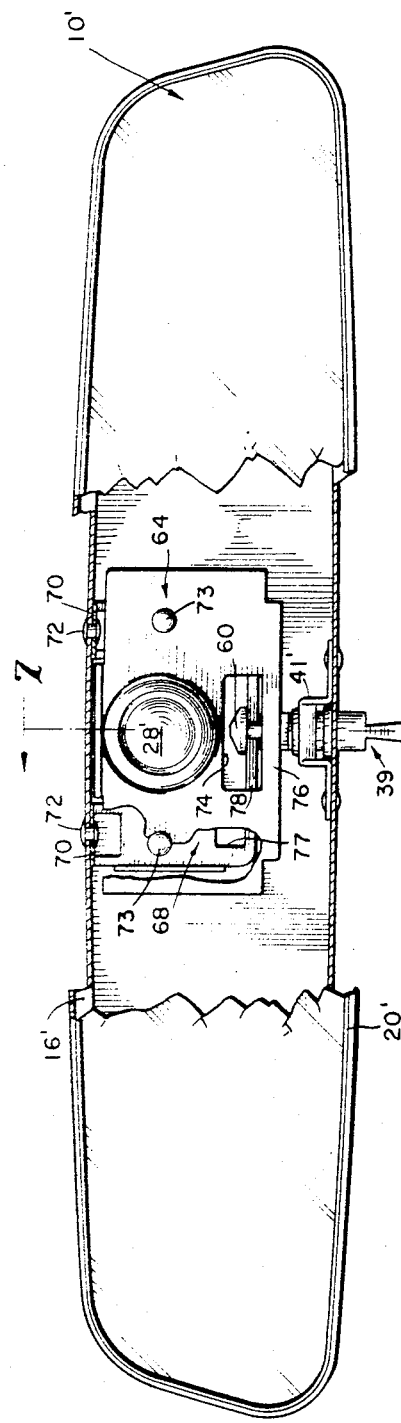
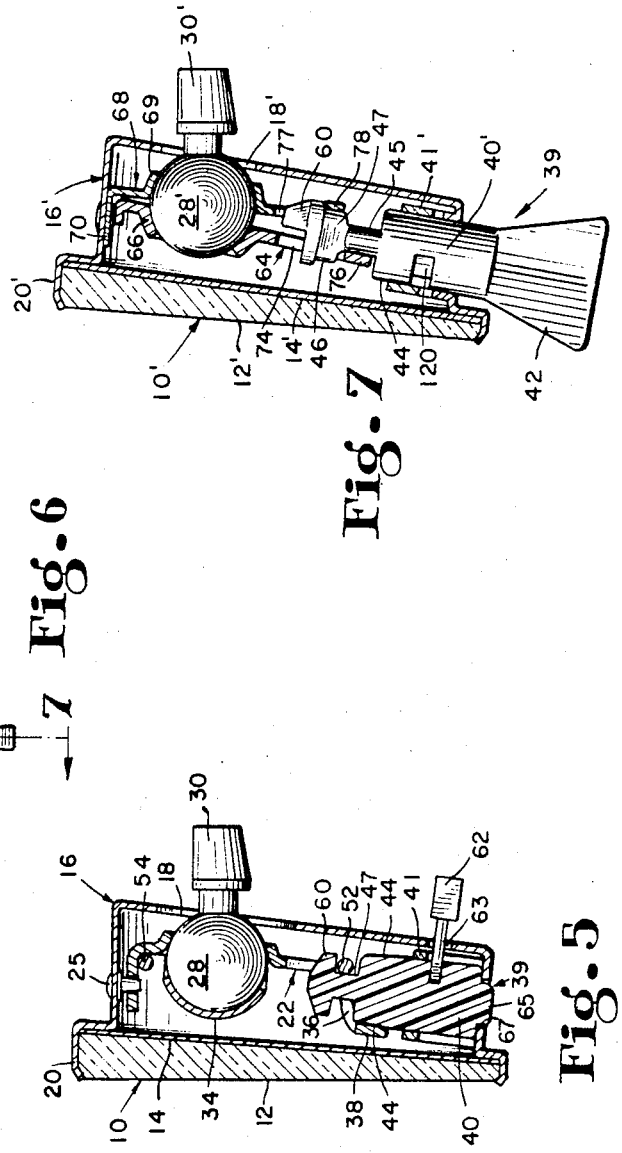

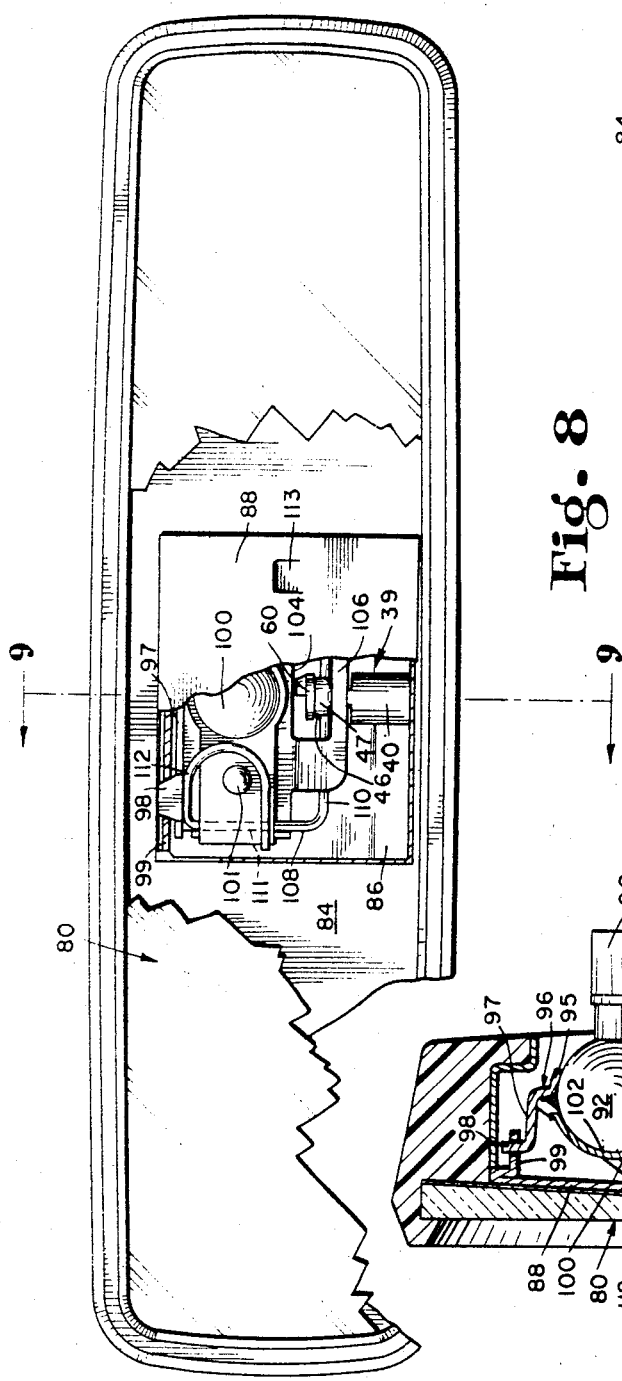
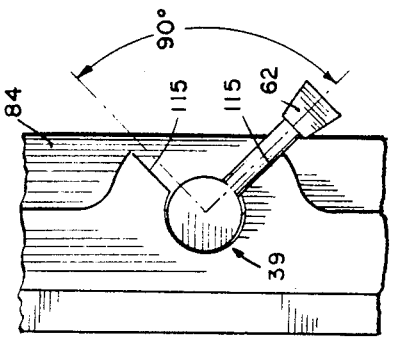
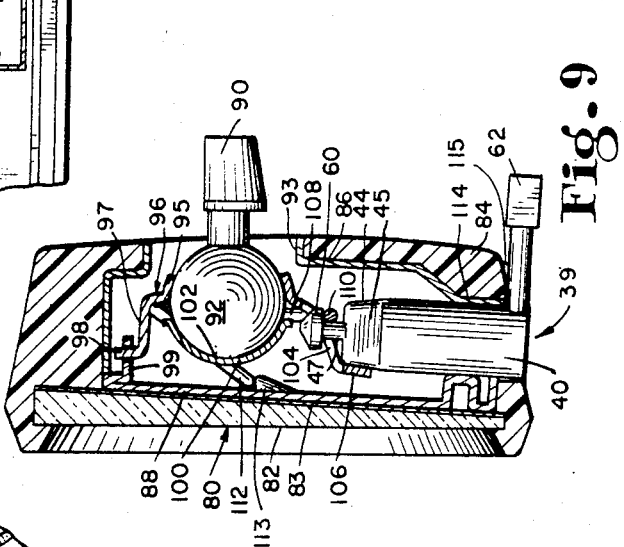

United States Patent Office 3,427,094
Patented Feb. 11, 1969

3,427,094
REARVIEW MIRROR AND ADJUSTING MECHANISM THEREFOR
George E. Scheitlin and John C. Brighton, Columbus, Ind., assignors to Arvin Industries, Inc., Columbus, Ind., a corporation of Indiana
Filed Oct. 17, 1966, Ser. No. 587,164
U.S. Cl. 350—281         14 Claims
Int. Cl. G02b 17/00

This invention relates to a rearview mirror adapted for use in automobiles, and more particularly to a rearview mirror which includes a transparent low efficiency reflector disposed in front of, and at an angle to, a high efficiency reflector, such that tilting of the mirror produces either a dimly or a brightly reflected image.

It is an object of the invention to provide a rearview mirror of the type referred to above which will be of attractive appearance, which can be easily adjusted to produce the desired amount of reflectance without displacing the entire mirror to remove the reflected image from the view of an observer, and which will be releasably retained in each of its positions of adjustment.

In carrying out the invention in its preferred form, there is provided a mirror carried in a mirror housing. The mirror is a double mirror having a low efficiency reflector disposed in front of, and at an angle to, a high efficiency reflector for reflecting either a dim or a bright image back to an observer.

A tilt plate is carried within the housing and is swingably connected thereto. Said tilt plate is movably mounted on a mounting stud projecting outwardly from the housing to dispose the mirror in a position to reflect an image back to an observer. Conveniently, biasing means are interposed between the tilt plate and housing to urge said housing into a normal position of maximum reflectance in which the high efficiency reflector is disposed in a position to reflect a bright image back to an observer.

Bracket means are provided in the housing and an actuator is rotatably carried therein. Said actuator is provided with sets of cam faces interposed between sets of cam flats engageable with the tilt plate and biasing means whereby rotation of said actuator to bring one of the cam faces and one of the cam flats into engagement with the tilt plate and biasing means, respectively, will move said housing with respect to the tilt plate to dispose the low efficiency reflector in position to reflect a dim image back to an observer. Conversely, movement of said actuator into a position to dispose one of the cam flats and one of the cam faces into engagement with the tilt plate and biasing means, respectively, will cause the biasing means to move the housing with respect to the tilt plate to dispose the high efficiency reflector in operative position to reflect a bright image back to an observer.

Other objects and features of the invention will become apparent from the more detailed description which follows, and from the accompanying drawings, in which:

FIG. 1 is a front elevation of a rearview mirror embodying the invention with portions thereof being broken away to show the tilting mechanism;

FIG. 2 is a bottom plan view of the mirror shown in FIG. 1;

FIG. 3 is an enlarged vertical section taken on the line 3—3 of FIG. 1;

FIG. 4 is an enlarged perspective view of the actuator shown in FIG. 1;

FIG. 5 is a vertical section similar to FIG. 3 but showing a modified form of the actuator;

FIG. 6 is a front elevation of a modified embodiment of the rearview mirror shown in FIG. 1, with portions thereof being broken away;

FIG. 7 is an enlarged vertical section taken on the line 7—7 of FIG. 6;

FIG. 8 is a front elevation of another modified form of the rearview mirror shown in FIG. 1, with portions thereof being broken away;

FIG. 9 is an enlarged vertical section taken on the line 9—9 of FIG. 8; and

FIG. 10 is a fragmentary bottom plan view of the mirror shown in FIG. 8.

In the rearview mirror illustrated in the drawings, there is provided a mirror 10 having a generally rectangular shape and comprising a low efficiency reflector 12 disposed in front of, and at a slight angle to, a high efficiency reflector 14. Each of these reflectors produces a separate image of different reflected intensity, but with the mirror being positioned at a relatively great distance from the observer, the image from only one of the reflectors will be perceptible at a time.

In the embodiment illustrated in FIGS. 1-3, the mirror is carried in a housing 16 conveniently formed from a dished sheet-metal stamping provided with an aperture 18 in its back wall and a peripheral flange 20 extending around its front edge and press fit over the edges of the mirror 10 to rigidly retain said mirror in the open front face of said housing.

Disposed within the housing 16 between its back wall and the mirror 10 is a tilt plate 22 having a forwardly extending flange 23 along its upper edge and a forwardly extending flange 24 at each of its lateral edges. The upper wall of the housing 16 may be tiltably connected to the flange 23 of plate 22 in any convenient manner. In the embodiment shown in FIG. 3, a pair of pins 25 project downwardly from the upper housing wall and are received in openings in the plate flange 23 to thus permit relative tilting movement between said housing and plate about the axis of a line interconnecting the pins 25.

A rearwardly extending shouldered aperture 26 is formed in plate 22 and is received on the ball 28 of a mounting stud 30. The plate 22 is retained on ball 28 by a leaf spring 32 connected to said plate by rivets 33 and provided with a semi-spherical recess 34 slidably received over the front face of the ball 28. Thus, aperture 26 and recess 34 act in combination with ball 28 to form a ball and socket joint so that the mirror can be swiveled on said ball into the desired position of adjustment for reflecting an image back to an observer with the biasing action of spring 32 retaining the mirror in the desired position of adjustment.

The mirror 10 is adjustable to reflect the image from a selected one of the reflectors 12 or 14 back to the observer by tilting the housing, and thus the mirror, about the axis of the pivotal connection between the plate 22 and housing 16. To produce such tilting action, the lower portion of plate 22 is offset forwardly and provided with an opening 36, the lower edge of which is defined by a transversely extending stretch 38. Said stretch is engageable with an actuator 39 having a body portion 40 rotatably carried in a bracket 41 mounted on the lower wall of housing 16. Conveniently, actuator 39 has a finger grip 42 below body 40 and projecting through the bottom wall of the housing so that it may be gripped by an observer for rotating the actuator to dispose the desired reflector 12 or 14 in operative position. As best shown in FIG. 4, a pair of diametrically opposed cam faces 44 interposed between a pair of diametrically opposed elongated cam flats 45 are provided on the actuator above the body 40. Said cam faces and flats are in the same horizontal plane and are horizontally aligned with stretch 38 on tilt plate 22. A second set of diametrically opposed cam faces 46 interposed between a second set of diametrically opposed elongated cam flats 47 are provided on the actuator above cam faces 44 and cam flats 45, cam faces 46 being disposed in alignment with cam flats 45 and cam flats 47 being disposed in alignment with cam faces 44. The cam faces 46 and cam flats 47 are in the same horizontal plane and are engageable with the intermediate transverse stretch 52 of a generally U-shaped torsion spring 54, said stretch lying to the rear of and above plate stretch 38.

As shown in FIG. 1, spring stretch 52 interconnects a pair of vertically extending stretches 57. The stretches 57 terminate at their upper ends in downwardly curved ends 58 angled forwardly with respect to the stretches 57 and seated in recesses 59 formed in the bottom wall of housing 16. As shown, spring 54 is fixedly retained on plate 22 by spring 32 holding it against the front face of plate 22 with the upper portions of spring ends 58 bearing against the plate flange 23 and top edge of flange 24. Thus, spring 54 serves to retain plate 22 on pins 25 and bias it to tilt its lower end rearwardly with respect to the housing. As shown in FIG. 4, a cap 60 is formed on the upper end of actuator 39 above cam faces and flats 46 and 47 to overlie spring stretch 52 to limit downward movement of the actuator. Said cap has an axially offset point 61 provided with sloping side walls to facilitate insertion of the actuator between plate and spring stretches 38 and 52 during assembly. With the actuator between said plate and spring stretches, plate 22 will swing forwardly with respect to the housing placing spring 54 in torsion. When the actuator 39 is in position to dispose reflector 12 in position to reflect an image back to an observer, upward movement of the actuator is limited by its body 40 engaging the bottom of plate stretch 38, and with said actuator in position to dispose reflector 14 in position to reflect an image back to an observer, upward movement of the actuator is limited by the upper ends of cam faces 44 engaging the bottom of spring stretch 52. Spring stretch 52, by clamping actuator 39 against plate 22, reduces vibration of the tilting assembly and further serves to retain the tilting assembly in position so that the position of the entire mirror can be adjusted on the ball stud 28.

When the actuator is rotated to bring one of the cam faces 44 into engagement with plate stretch 38, the lower end of housing 16 is carried rearwardly (away from the driver) to tilt the mirror into a position in which the high efficiency reflector 14 is in operative position to reflect a bright image back to an observer. In this position, one of the elongated cam flats 47 will be in engagement with the spring stretch 52 for releasably retaining the mirror in this position of adjustment. Conversely, to adjust the mirror to bring reflector 12 into operative position, actuator 39 is rotated through an arc of 90 degrees to bring a cam flat 45 into engagement with plate stretch 38 and a cam face 46 into engagement with spring stretch 52. This permits spring stretch 52 to move forwardly with respect to the tilt plate, and spring 54 swings the lower end of the housing 16 forwardly (toward the driver) to dispose reflector 12 in operative position to reflect a dim image back to the observer, elongated cam flat 45 releasably retaining the mirror in this position of adjustment. As shown, the actuator 39 is rotatable through a full 360 degrees in either direction in 90 degree increments for adjusting the mirror 10.

The mirror shown in FIGS. 1–3 is like the mirror shown in FIG. 5 except for the construction of the actuator and its mounting in the housing 16. As shown in FIG. 5, the actuator 39 is carried in the bracket 41 on the lower wall of housing 16, but it is not provided with a finger grip projecting through the bottom housing wall. Rather, a boss 65 in the lower end of the actuator is rotatably carried in an opening 67 in the bottom housing wall and a radially extending lever 62 is mounted on the actuator body 40 to project rearwardly through a slot 63 formed in the back wall of housing 16. Thus, rotation of actuator 39 in one direction by lever 62 will dispose one of the cam faces 44 in engagement with forwardly offset stretch 38 on plate 22 and the lower end of the housing will tilt away from the observer so that reflector 14 will reflect a bright image back to an observer. Conversely, movement of lever 62 in an opposite direction to dispose one of the cam faces 46 in engagement with stretch 52 of spring 54 will cause said spring to tilt the lower portion of the housing 16 toward the observer to cause reflector 12 to reflect a dim image back to an observer. Conveniently, the slot 63 shown in FIG. 5 is of a length sufficient to permit lever 62 to rotate actuator 39 through an arc of 90 degrees to effect adjustment of the mirror.

In the embodiment illustrated in FIGS. 6 and 7, the mirror 10′ is provided with angularly disposed low and high efficiency reflectors 12′ and 14′ and is carried in a housing 16′ provided with a mounting stud opening 18′ in its rear wall and a peripheral mirror-retaining flange 20′ extending around its open front side.

A tilt plate 64 is carried within housing 16′ and is provided with a shouldered opening 66 adapted to be received on the ball 28′ of a mounting stud 30′. The tilt plate is retained on ball 28′ and is tiltably interconnected to the housing 16′ by a spring plate 68 having a shouldered opening 69 received on ball 28′ and provided at its upper end with a pair of forwardly projecting flanges 70 connected to the upper wall of housing 16′ by rivets 72 for tiltably connecting the plate 64 to the housing. As shown in FIG. 6 plates 64 and 68 are fixedly connected by a pair of rivets 73 disposed on opposite sides of ball 28′.

As shown, plate 64 is provided adjacent its lower end with an opening 74 the lower edge of which is defined by a transversely extending stretch 76. Spring 68 is offset rearwardly adjacent its lower end and is also provided with an opening 77 whose lower edge is defined by a transversely extending stretch 78 disposed slightly above plate stretch 76. The actuator illustrated in FIG. 4 is employed in the embodiment shown in FIGS. 6 and 7 and is carried in a bracket 41′ mounted on the lower housing wall. The cam faces and flats 44 and 45 of actuator 39 are engageable with plate stretch 76 and cam faces 46 and cam flats 47 are engageable with the spring stretch 78 to place spring 68 in a stressed condition. Rotation of actuator 39 to move one of the cam faces 44 into engagement with plate stretch 76 and one of the cam flats 47 into engagement with spring stretch 78 will tilt the lower end of housing 16′ away from a driver to dispose reflector 14′ in position to reflect a bright image back to an observer. Conversely, rotation of the actuator to move one of the cam faces 46 into engagement with spring stretch 78 and one of the cam flats 45 into engagement with plate stretch 76 will cause spring plate 68 to move the lower end of housing 16′ toward the driver to bring low efficiency reflector 12′ into operative position to reflect a dim image back to an observer. Said actuator is retained in a fixed axial position in the housing by its cap 60 and the tops of cam faces 44 engaging spring stretch 78 and its shoulder 40 and the bottoms of cam faces 46 engaging plate stretch 76. Like the actuator shown in FIG. 1, the actuator shown in FIG. 6 is rotatable in either direction through a full 360 degrees in 90 degree increments.

In the embodiment illustrated in FIGS. 8 and 9, a mirror 80 having a low efficiency reflector 82 is disposed in front of and at an angle to a high efficiency reflector 83 is fixedly mounted in the open forward face of a plastic housing 84. As shown in FIG. 9 the tilting mechanism is carried in a substantially fluid tight sheet-metal casing to prevent the plastic forming the housing from coating the tilting mechanism during the formation of the housing. The casing is encapsulated in the housing and comprises a rear shell 86 fixedly connected to a front shell 88 connected to mirror 80. A mounting stud 90 having a ball 92 thereon projects through an opening 93 in shell 86. Said ball is swivelly carried in a shouldered opening 95 in a tilt plate 96 having a forwardly projecting flange 97 provided at its upper end with a pair of upwardly projecting fingers 98 swingably received in openings formed in a rearwardly projecting flange 99 on shell 88 for thus tiltably interconnecting plate 96 to shell 88 and to housing 84 and mirror 80. Plate 96 is retained on ball 92 by a leaf spring 100 connected to the front face of plate 96 by rivets 101 and having a semi-spherical recess 102 received over the forwardly presented face of said ball.

The lower end of plate 96 is offset forwardly and is provided with an opening 104, the lower edge of which is defined by a transversely extending stretch 106. A spring 108 is fixedly carried against the front face of the upper portion of plate 96 by spring 100 and is provided with a transverse stretch 110 disposed rearwardly of and slightly above plate stretch 106. The ends of spring stretch 110 are connected to upwardly extending stretches 111 underlying spring 100 and terminating at their upper ends in a pair of forwardly angled loops 112 having their upper ends bearing against plate flange 97 and their outer free ends bearing against bosses 113 formed on shell 88, said spring biasing plate fingers 98 upwardly into the openings on flange 99.

The actuator 39 shown in FIG. 5 is employed in the embodiment show in FIGS. 8 and 9. Said actuator is rotatably carried in openings formed in a bracket-forming sleeve 114 formed in shell 86 and opening formed in a flange 115 on the bottom of shell 88. The actuator body 40 projects downwardly from the casing and is connected to a rearwardly extending lever 62. As with the other embodiments of the invention, cam faces 44 and flats 45 are adapted to engage plate stretch 106 and cam faces 46 and cam flats 47 are adapted to engage spring stretch 110. With the actuator interposed between plate and spring stretches 106 and 110, the lower end of plate 96 will be urged forwardly placing spring 108 in torsion. When the actuator is rotated to dispose one of the cam faces 44 engaging plate stretch 106 and one of the cam flats engaging spring stretch 110, the lower portion of the mirror will be tilted away from the driver to dispose the high efficiency reflector 83 in position to reflect a bright image back to the observer.

Conversely, with one of the cam faces 46 in engagement with spring stretch 110 and one of the cam flats 45 in engagement with plate stretch 106, the lower end of the housing will be tilted forwardly under the action of spring 108 to dispose reflector 82 in position to reflect a dim image back to an observer. Said actuator is retained in a fixed axial position in the housing by its cap 60 and the tops of cam faces 44 engaging spring stretch 110 and its body 40 and the bottoms of cam faces 46 engaging plate stretch 106.

Conveniently, it may be desirable to limit rotational movement of actuator arm 62 to an arc of 90 degrees. To this end, as shown in FIG. 10, the bottom outer wall of the housing 84 can have a pair of arcuately spaced abutments 115 in the path of rotation of arm 62 for limiting its rotational movement.

As is apparent, in each of the embodiments illustrated, it is only necessary to rotate the actuator through an arc of 90 degrees to adjust the mirror between a position in which it reflects a dim image back to an observer and a position in which it reflects a bright image back to an observer. Thus, while the actuator 39 has been shown as employing pairs of cam faces 44 and 46 and flats 45 and 47, it is necessary that only one of each of such cam faces and flats be provided. In such an instance, and where the actuator does not have a radially projecting control arm 62 whose adjusting movements are limited, it is also desirable to provide the actuator with an arcuate slot 120 (FIG. 4) in its body portion 40. Said slot has an arcuate extent of 90 degrees and is engageable with any type of a tang or finger which may be struck out of the brackets 41 and 41' for thus limiting rotational movement of the actuator through an arc of 90 degrees.

It is to be further understood that the actuator illustrated in FIG. 5 employing the lever 62 instead of finger grip 42 can be employed in any of the embodiments with appropriate slots being formed in the housing back walls to accommodate said lever.

We claim:

1. In a rearview mirror, a housing having its front side open, a mirror fixedly secured in said housing and having a low and a high efficiency reflector angularly disposed in front to back relationship, a tilt plate, means pivotally interconnecting said tilt plate to said housing at one end thereof, spring means contacting said tilt plate closely adjacent the tilt plate and housing interconnecting means and acting in tension between said tilt plate and housing, bracket means in said housing remote from said tilt plate and housing connecting means, an actuator rotatably carried in said bracket means and projecting out of said housing, said actuator having a circumferentially spaced cam face and cam flat in alignment with each other and engageable with said tilt plate and said spring means remote from said tilt plate and housing interconnecting means whereby said actuator is rotatable to move said tension of said spring means to dispose one of said reflectors in position to reflect an image back to an observer and to move said cam face into engagement with said tilt plate to permit said spring means to move said housing with respect to said tilt plate to dispose the other of said reflectors in position to reflect an image back to an observer, and means on said tilt plate for swively mounting it on a mounting member.

2. In a rearview mirror, a housing having its front side open, a mirror fixedly secured in said housing and having a low and a high efficiency reflector angularly disposed in front to back relationship, a tilt plate, means pivotally interconnecting said tilt plate to said housing at one end thereof, spring means acting in tension between said tilt plate and housing, bracket means in said housing remote from said tilt plate and housing connecting means, an actuator provided with a cylindrical body rotatably carried in said bracket means and projecting out of said housing, said actuator having a first set of spaced cam faces interposed between a first set of cam flats and a second set of cam faces aligned with said first set of cam flats and interposed between a second set of cam flats aligned with said first set of cam faces, said first and second sets of cam faces and flats being respectively engageable with said tilt plate and spring means, said actuator being rotatable to move one of the cam faces in said first set into engagement with said tilt plate and one of the cam flats in said second set into engagement with said spring means to dispose one of the reflectors in position to reflect an image back to an observer and being rotatable to dispose one of the cam faces in said second set into engagement with said spring means and one of the cam flats in said first set into engagement with the tilt plate to dispose the other of said reflectors in position to reflect an image back to an observer.

3. The invention as set forth in claim 2 in which the cam faces and flats in said first and second sets are engageable with transverse stretches on said tilt plate and spring means, respectively, said actuator having a portion of said body engaging the bottom of the stretch on said tilt plate and a cap engaging the top of the stretch on said spring means, and the tops of the cam faces in said first set are engageable with the stretch on said spring means and the bottoms of the cam faces in said second set are engageable with the stretch on said tilt plate.

4. The invention as set forth in claim 2 in which a lever is mounted on said actuator and projects radially outwardly from said housing.

5. The invention as set forth in claim 4 with the addition that means are provided on said housing for limiting the movement of said lever.

6. The invention as set forth in claim 2 in which said actuator is rotatable in either direction about its axis through arcs of 360 degrees.

7. The invention as set forth in claim 2 in which said means pivotally interconnecting said tilt plate to said housing comprises a plurality of pins on said housing received in openings formed in said tilt plate, and said spring means bindingly urges said actuator against said tilt plate and acts between said housing and tilt plate to retain said tilt plate on said pins.

8. The invention as set forth in claim 2 in which the portions of the tilt plate and spring means engageable with said first and second sets of cam faces and flats are in vertically and fore-and-aft spaced relation to each other.

9. The invention as set forth in claim 2 in which said spring means comprises a torsion spring having an intermediate stretch fixedly connected to said tilt plate and engageable with said second set of cam faces and flats, and a pair of outwardly projecting generally vertical end stretches connected to the ends of said intermediate stretch and bearing against the bottom housing wall.

10. The invention as set forth in claim 9 in which said housing is provided with means for retaining the end stretches of said spring in a fixed position with respect to said housing.

11. The invention as set forth in claim 2 in which said spring means comprises a spring plate fixedly connected to said tilt plate, and said means pivotally interconnecting said tilt plate to the housing comprises a pair of members on said spring plate fixedly connected to said housing.

12. The invention as set forth in claim 2 with the addition that a casing is fixedly mounted in said housing and fixedly connected to said mirror, said tilt plate and spring means are carried in said casing, and said tilt plate has a pair of members swingably connected to said casing.

13. The invention as set forth in claim 12 in which said spring means comprises a torsion spring fixedly connected to said tilt plate and provided with portions in bearing engagement with said actuator and casing.

14. The invention as set forth in claim 10 in which said casing is substantially fluid tight and is encapsulated with said housing.

References Cited

UNITED STATES PATENTS

| | | | |
|---|---|---|---|
| 2,839,964 | 6/1958 | Ponce | 350—281 |
| 2,843,017 | 7/1958 | Ponce | 350—281 |
| 2,993,410 | 7/1961 | Bertell et al. | 350—281 |
| 2,995,982 | 8/1961 | Scheitlin et al. | 350—281 |
| 3,004,473 | 10/1961 | Arthur et al. | 350—281 |
| 3,029,701 | 4/1962 | Nelson | 350—281 |
| 3,253,510 | 5/1966 | Clayton | 350—281 |
| 3,279,315 | 10/1966 | Albers | 350—281 |

DAVID SCHONBERG, *Primary Examiner.*

P. R. GILLIAM, *Assistant Examiner.*

PO-1050
(5/69)

UNITED STATES PATENT OFFICE
CERTIFICATE OF CORRECTION

Patent No. 3,427,094            Dated February 11, 1969

Inventor(s) George E. Scheitlin and John C. Brighton

It is certified that error appears in the above-identified patent and that said Letters Patent are hereby corrected as shown below:

In claim 1, column 6, line 19, after "said"
    (second occurrence) insert:
      -- cam flat into engagement with
    said tilt plate against the -- .

SIGNED AND
SEALED

OCT 21 1969

(SEAL)
Attest:

Edward M. Fletcher, Jr.            WILLIAM E. SCHUYLER, JR.
Attesting Officer                      Commissioner of Patents